March 5, 1957

P. E. BESSIERE 2,784,329

SPEED LIMITING DEVICES FOR REVOLVING SHAFTS
SUBJECTED TO THE ACTION OF A VARIABLE
DRIVING TORQUE

Filed Jan. 4, 1954

2 Sheets-Sheet 1

INVENTOR:
PIERRE ETIENNE BESSIERE
BY
Bailey, Stephens & Huettig
ATTORNEYS

United States Patent Office 2,784,329
Patented Mar. 5, 1957

2,784,329

SPEED LIMITING DEVICES FOR REVOLVING SHAFTS SUBJECTED TO THE ACTION OF A VARIABLE DRIVING TORQUE

Pierre Etienne Bessière, Paris, France, assignor, by mesne assignments, to Telma, Paris, France, a society of France Application January 4, 1954, Serial No. 401,763

1 Claim. (Cl. 310—93)

The present invention relates to devices for automatically limiting the speed of loads of different weights dropping under the action of gravity, said loads acting on a shaft so as to drive it in rotation at a speed proportional to that of the downward movement of the load. My invention is therefore especially concerned with speed limiting devices for winches of hoisting apparatus such as cranes, mine cage hoists, travelling cranes, and so on.

The object of my invention is to provide a speed limiting device of this type which is better adapted to meet the requirements of practice than those used for the same purposes up to the present time.

According to my invention, I make use of an eddy-current brake mounted to exert on the above-mentioned shaft a torque opposing that exerted thereon by the dropping load, and this eddy-current brake is regulated by means of a rheostat inserted in the energizing circuit thereof so as to let, when wholly short-circuited, a current flow through said circuit which causes the brake to develop a torque at least equal to the driving torque created by the maximum load for which the device is to be used, whereas no current capable of operating the brake circulates through said circuit when the whole of the rheostat resistance is inserted therein, said rheostat being controlled by a speed governor responsive to the speed variations of the shaft and subjected to the opposing action of resilient means adjusted to enable the governor to start short-circuiting the rheostat only for a relatively high minimum limit value of the speed of the dropping load and to short-circuit the whole of the rheostat resistance when the dropping load speed reaches a maximum limit value, the difference between these values being small as compared with the minimum limit value, whereby all loads, whatever be their weight, have their dropping speeds limited to values which, although different according to said weight, are within the short range between said two limit values.

Figure 1:
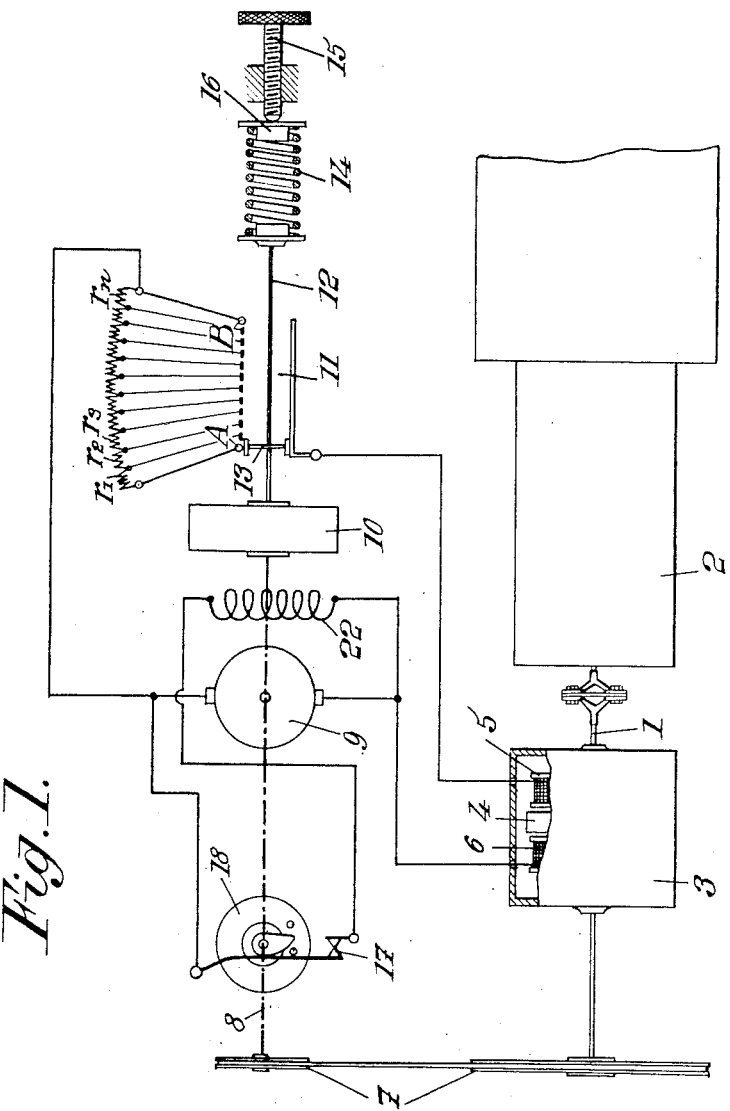

A preferred embodiment of my invention will be hereinafter described with reference to the accompanying drawings, given merely by way of example, and in which:

Fig. 1 diagrammatically shows a speed limiting device made according to an embodiment of my invention.

Figure 2:
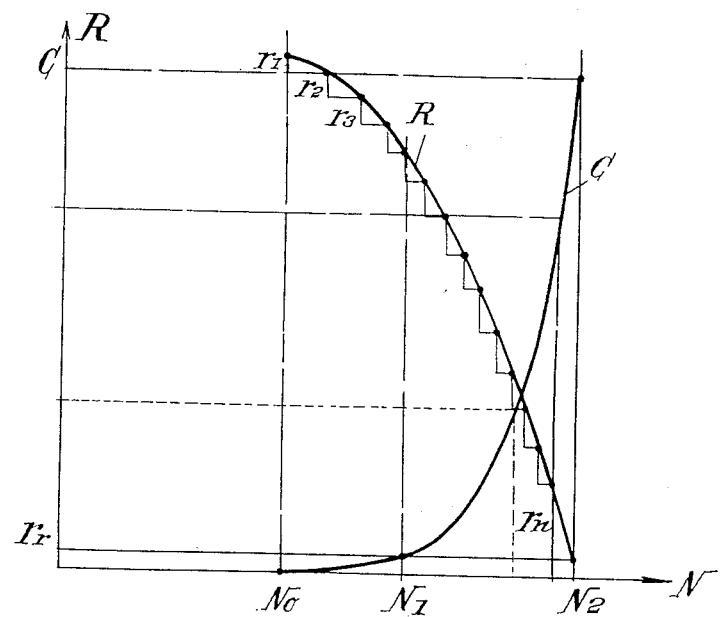

Fig. 2 shows two curves for explaining the arrangement of the rheostat included in the device of Fig. 1.

My invention is especially applicable to the case where it is desired to provide, in addition to a main braking device, a device for limiting the speed at which a load P, carried by a cable (or a chain) passing around a drum or the like, is allowed to move down, this load being essentially variable within a range extending from a minimum value $P_1$ to a maximum value $P_2$.

In order to limit the speed of revolution of the shaft, I make use of an eddy-current brake mounted on the shaft of the drum or on a shaft operatively connected with this first mentioned shaft, this brake being provided with means for automatically adjusting the braking torque in response to variations of the speed, preferably by acting upon the intensity of the brake energizing current.

For practical purposes, it would be difficult to keep the limit speed at a constant value in the case of a device such as a crane subjected to very variable loads. This is why, according to my invention, the brake energizing current is varied in accordance with the speed of revolution of the shaft so as to start from zero for a value of the speed close to the maximum admissible speed and to increase continuously up to a value which limits the speed of the shaft for the maximum value of the driving torque whereby the limit speed, while being variable with the load, remains between two limits $N_1$ and $N_2$ close to each other whatever be the value of this load.

It is known that, when the brake works under saturation conditions, which is the case at the speeds which are considered, the braking torque C is substantially proportional to the energizing current. It therefore suffices to vary the resistance $R_e$ of the external circuit (by varying the resistance R of the energizing circuit) to regulate the braking torque to the desired value, and this advantageously through a rheostat inserted in the energizing circuit of the brake and controlled by a governor responsive to variations of the speed of the shaft. Such a governor may be a centrifugal governor an eddy-current governor the torque of which is balanced by a torsional spring or any other suitable governor.

In the construction illustrated by Fig. 1, I mount on the shaft 1 of winch 2, or on a shaft operatively connected therewith, an eddy-current brake 3 of any known type which essentially includes a disc 4 fixed on shaft 1 and cores 5 carried by a fixed part and on which are wound energizing coils 6 to which current is supplied in a manner which will be hereinafter described.

Shaft 1 drives, advantageously through a transmission 7, a secondary shaft 8 on which are mounted a dynamo 9 and the above-mentioned governor 10 which acts in response to variations of the speed. Said governor controls a rheostat 11 including a great number of contact studs. Coils 6 are fed with current by dynamo 9 through rheostat 11. Governor 10 serves to push, through a rod 12, the sliding brush 13 of the rheostat against the action of a spring 14.

The brake must start operating only for a speed of revolution $N_0$ relatively close to $N_1$ or even coinciding therewith. This predetermined speed $N_0$ corresponds to the beginning of the displacement of the brush 13 of the rheostat. This operation is adjusted by varying the initial compression (or pull) of opposing spring 14, for instance by means of a screw 15 which determines the position of the plate 16 upon which said spring is bearing.

The law of variation of the force of spring 14 between the limits A and B of the displacements of sliding brush 13 is chosen so that it corresponds to the law which determines, in accordance with the value of the speed of revolution, the force acting upon the brush in the direction of its displacement. I thus obtain a stable balanced position of the brush for every speed ranging from $N_1$ to $N_2$. This condition is fulfilled if A and B are sufficiently close to each other, in particular when the governor is a centrifugal governor.

Advantageously, my device includes a safety device intended to place the braking device out of operation when the load is being lifted. This safety device is for instance constituted by an eddy-current disc 18 or a friction device fitted on secondary shaft 8 and arranged so that by acting upon a circuit breaker 17, it opens or closes the energizing circuit 22 of the feed dynamo 9 according as shaft 8 is rotating in one direction (corresponding to an upward movement of the load) or in the opposed direction.

My speed limiting device works as follows. As long as, during the downward movement of the load, the speed thereof corresponds to a speed of revolution N relatively different from the limit speed $N_0$, the torque of the eddy-current brake is very small or even zero (see Fig. 2). When the speed of revolution N increases up to a value ranging from $N_0$ to $N_1$ ($N_1$ being close to $N_0$), the brush of the rheostat eliminates resistors $r_1$, $r_2$, and so on, intended gradually to establish the current in brake 4, 5, 6, but insufficient to create a substantial braking torque. If the speed of the load still increases until the speed of revolution N exceeds value $N_1$, the rheostat gradually eliminates other resistors and the braking torque reaches a substantial value and increases until it opposes the driving torque sufficiently to limit the speed. The speed is thus limited to a value ranging between $N_1$ and $N_2$. If the driving torque is maximum, the speed increases up to its maximum value $N_2$ for which the torque of the brake device is also maximum and prevents any speed increase beyond said maximum value.

It will be readily understood that it is advantageous, in order to obtain a value $N_2$ little different from value $N_1$, quickly to reduce the resistance offered by the rheostat as a function of the displacement of the sliding brush. This is what is diagrammatically indicated by Fig. 2 where curve R, which represents the resistance of the rheostat as a function of the speed of revolution N, has a quickly dropping shape. Advantageously, the resistance is caused to decrease in a manner as continuous as possible by multiplying the number of contact studs. In order to obtain a variation of the resistance of the rheostat close to that shown by curve R, resistors $r_1$, $r_2$ ... $r_n$ should be given gradually increasing values if they are connected to equidistant contact studs. It should be noted that the resistors might also be equal to one another and the contact studs located at distances from one another such that the law of switching off thereof follows a curve of variation analogous to that of Fig. 2.

Fig. 2 also shows the curve C representing the variation of the braking torque as a function of the speed of revolution, obtained by means of a rheostat the resistance of which corresponds to curve R.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

A device for automatically limiting the speed of loads of different weights dropping under the action of gravity which comprises, in combination, a shaft connected with the dropping load so as to be driven in rotation at a speed proportional to that of the downward movement of said load, an eddy-current brake mounted on said shaft to exert thereon a torque opposed to that exerted by said dropping load, said brake including an energizing circuit with a source of current therein and a rheostat in said circuit adjusted to make said brake at least practically inoperative when the total rheostat resistance is inserted in said circuit and to increase the current fed to said brake when more and more of said resistance is being short-circuited up to a value of said current such that the braking torque exerted by said brake is at least equal to the driving torque applied on said shaft by the maximum load for which the device is to be used, a speed governor operatively connected with said shaft, control means operative by said governor for gradually short-circuiting the resistance of said rheostat when the speed of said shaft increases and resilient means operatively connected with said control means for yieldingly opposing the action thereof on said rheostat, said resilient means being adjusted to enable said control means to start short-circuiting said rheostat resistance for a minimum limit value of the speed of said load and to short-circuit the whole of said rheostat resistance for a maximum limit value of the speed of said load, the difference between said values being small as compared with the minimum limit value, whereby all loads, whatever be their weight, have their dropping speeds limited to values which, although different according to said weight, are within the short range between said two limit values.

References Cited in the file of this patent

UNITED STATES PATENTS

| 474,447 | Gibboney | May 10, 1892 |
| 1,894,562 | Jansen | Jan. 17, 1933 |
| 2,437,996 | Carnegie | Mar. 16, 1938 |
| 2,551,839 | Jaeschke | May 8, 1951 |

FOREIGN PATENTS

| 26,574 | Great Britain | of 1909 |